Nov. 14, 1961 J. B. McCALLEY 3,008,278
METHOD AND APPARATUS FOR FORMING, FILLING AND SEALING BAGS
Filed Sept. 11, 1959 17 Sheets-Sheet 1
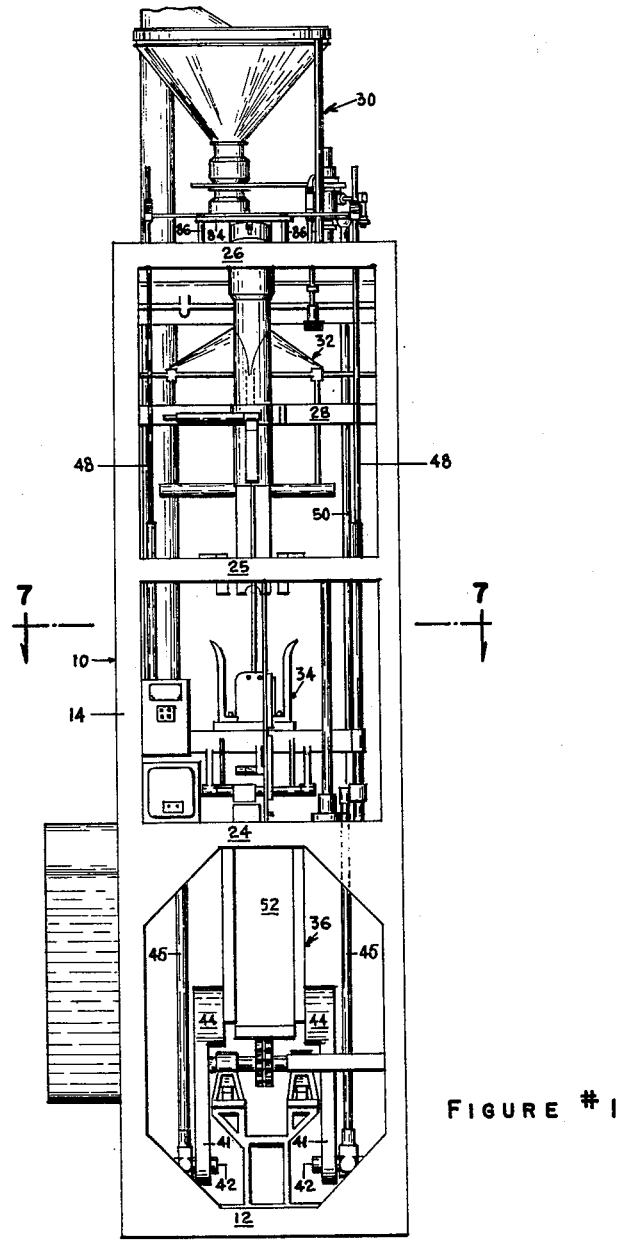
FIGURE #1
INVENTOR
JAMES B. McCALLEY
BY
ATTORNEY

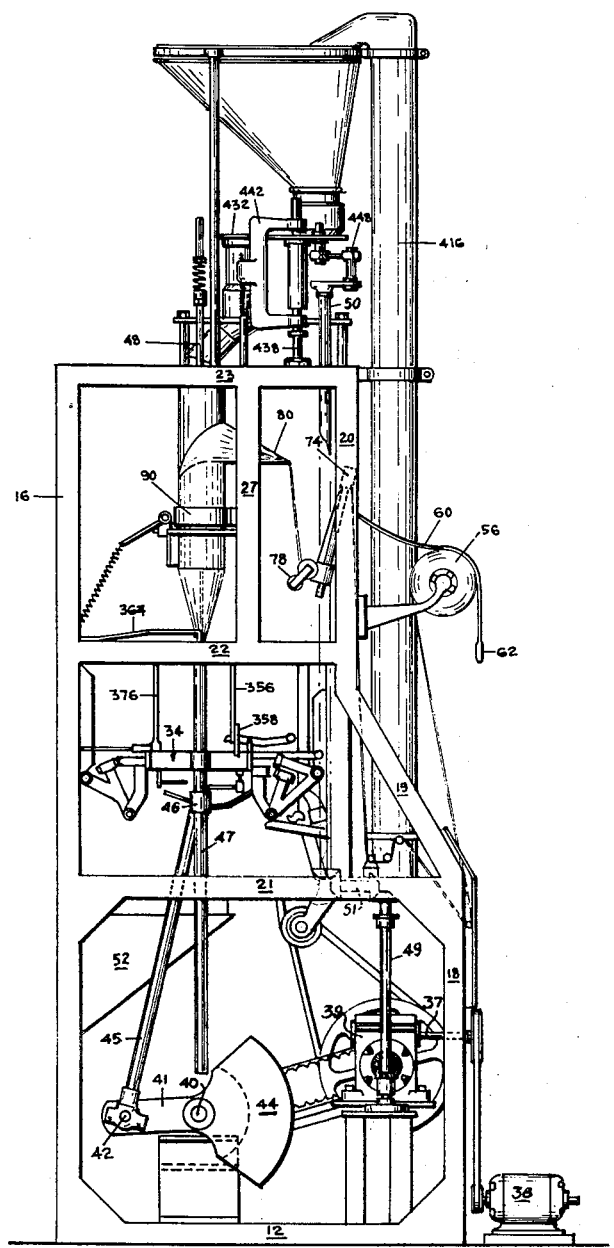
FIGURE #2

Nov. 14, 1961     J. B. McCALLEY     3,008,278
METHOD AND APPARATUS FOR FORMING, FILLING AND SEALING BAGS
Filed Sept. 11, 1959     17 Sheets-Sheet 3
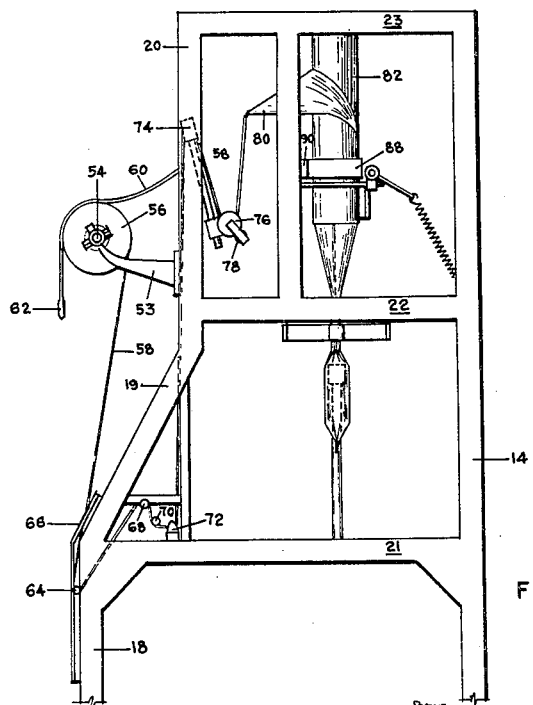
FIGURE #3
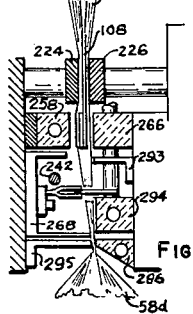
FIGURE #33
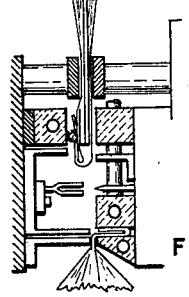
FIGURE #35
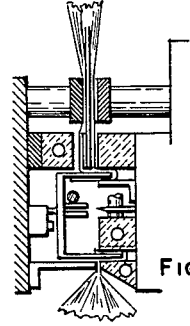
FIGURE #34
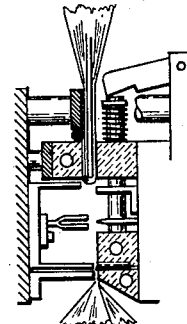
FIGURE #36
Inventor
JAMES B. McCALLEY
BY Kenward Palmer
Attorneys

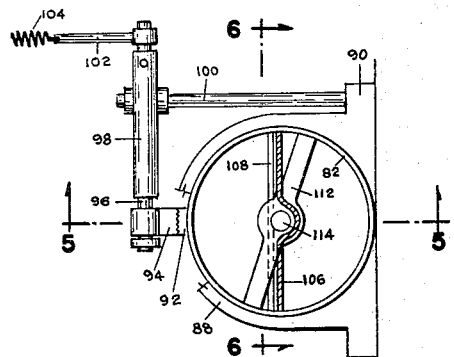
FIGURE #4
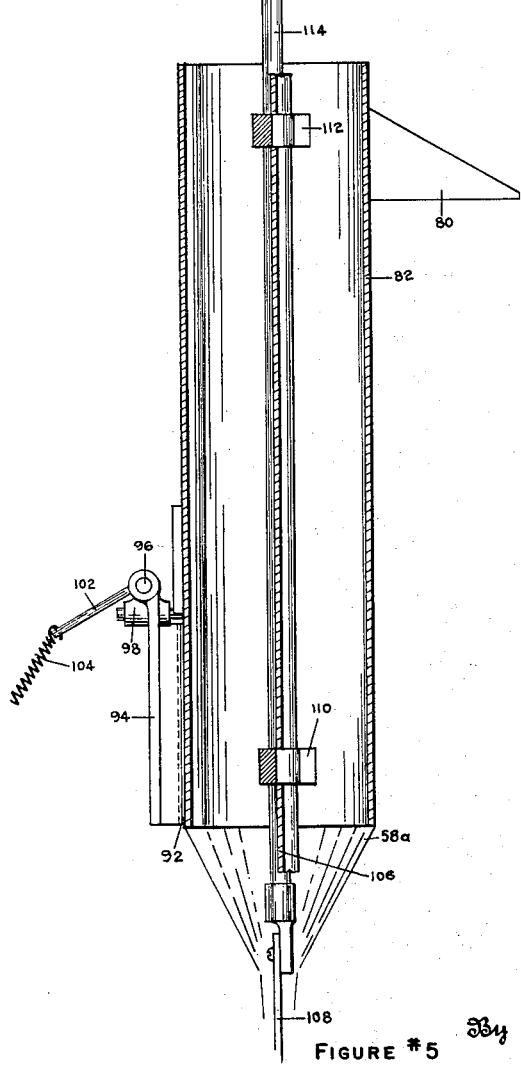
FIGURE #5
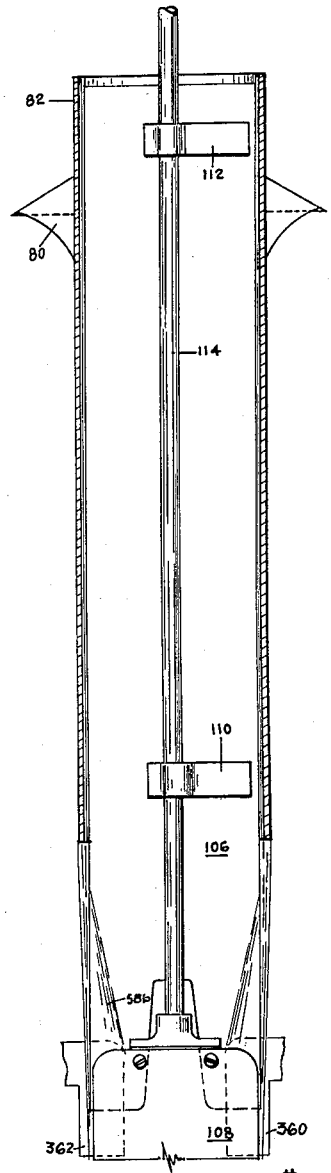
FIGURE #6
Inventor
JAMES B. McCALLEY Nov. 14, 1961  J. B. McCALLEY  3,008,278
METHOD AND APPARATUS FOR FORMING, FILLING AND SEALING BAGS
Filed Sept. 11, 1959  17 Sheets-Sheet 5
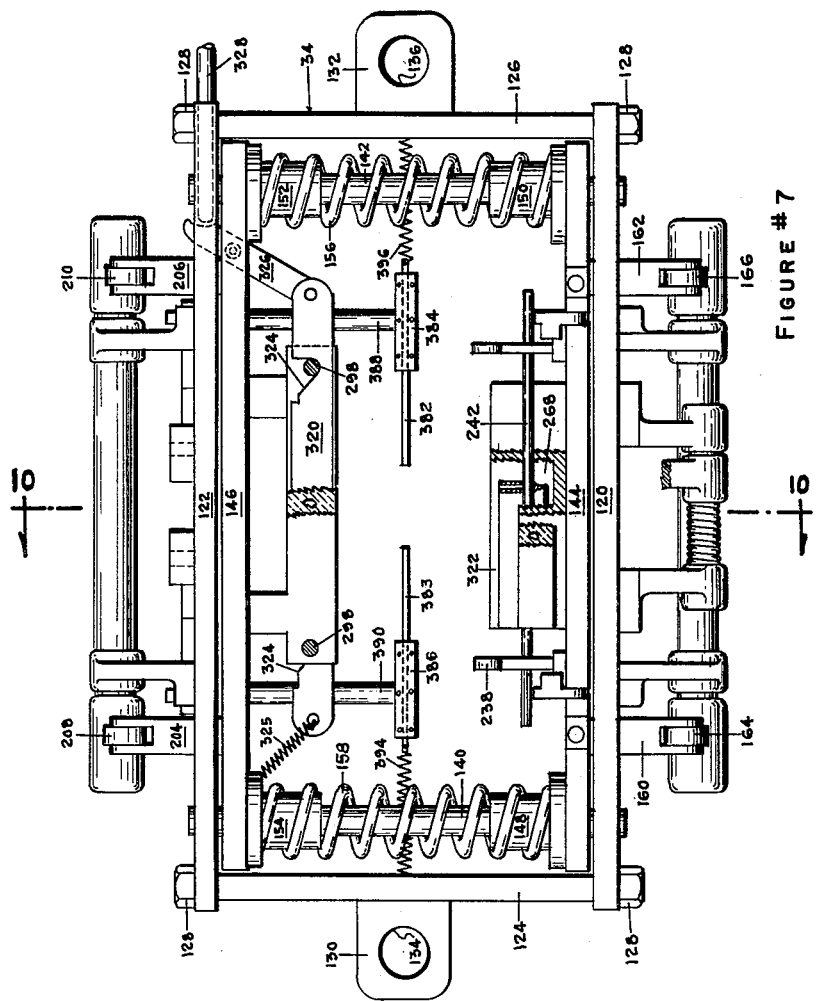
INVENTOR
JAMES B. McCALLEY
BY /Kenward Palmer/
ATTORNEY Nov. 14, 1961   J. B. McCALLEY   3,008,278
METHOD AND APPARATUS FOR FORMING, FILLING AND SEALING BAGS
Filed Sept. 11, 1959   17 Sheets-Sheet 6
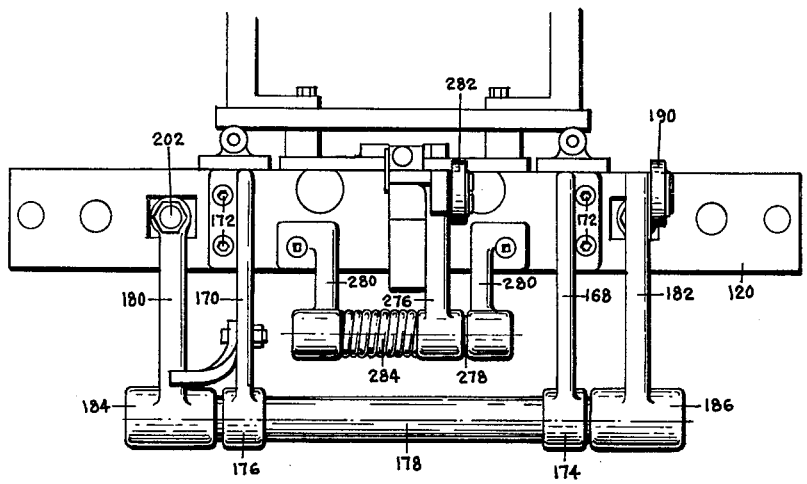
FIGURE #8
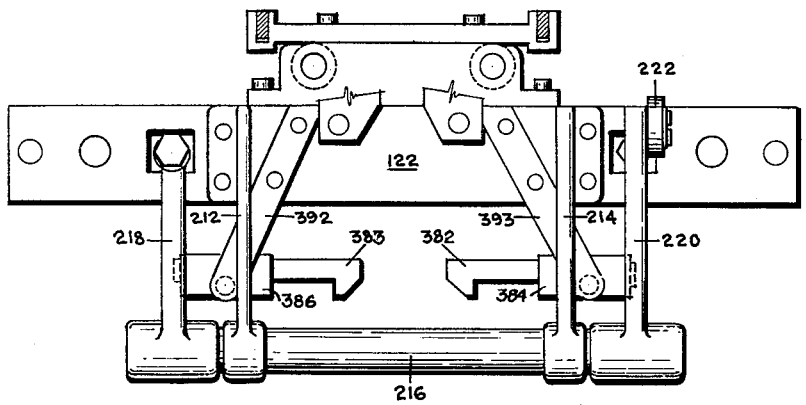
FIGURE #9
INVENTOR
JAMES B. McCALLEY
BY *Kenwood Palmer*
ATTORNEY Nov. 14, 1961   J. B. McCALLEY   3,008,278
METHOD AND APPARATUS FOR FORMING, FILLING AND SEALING BAGS
Filed Sept. 11, 1959   17 Sheets-Sheet 7
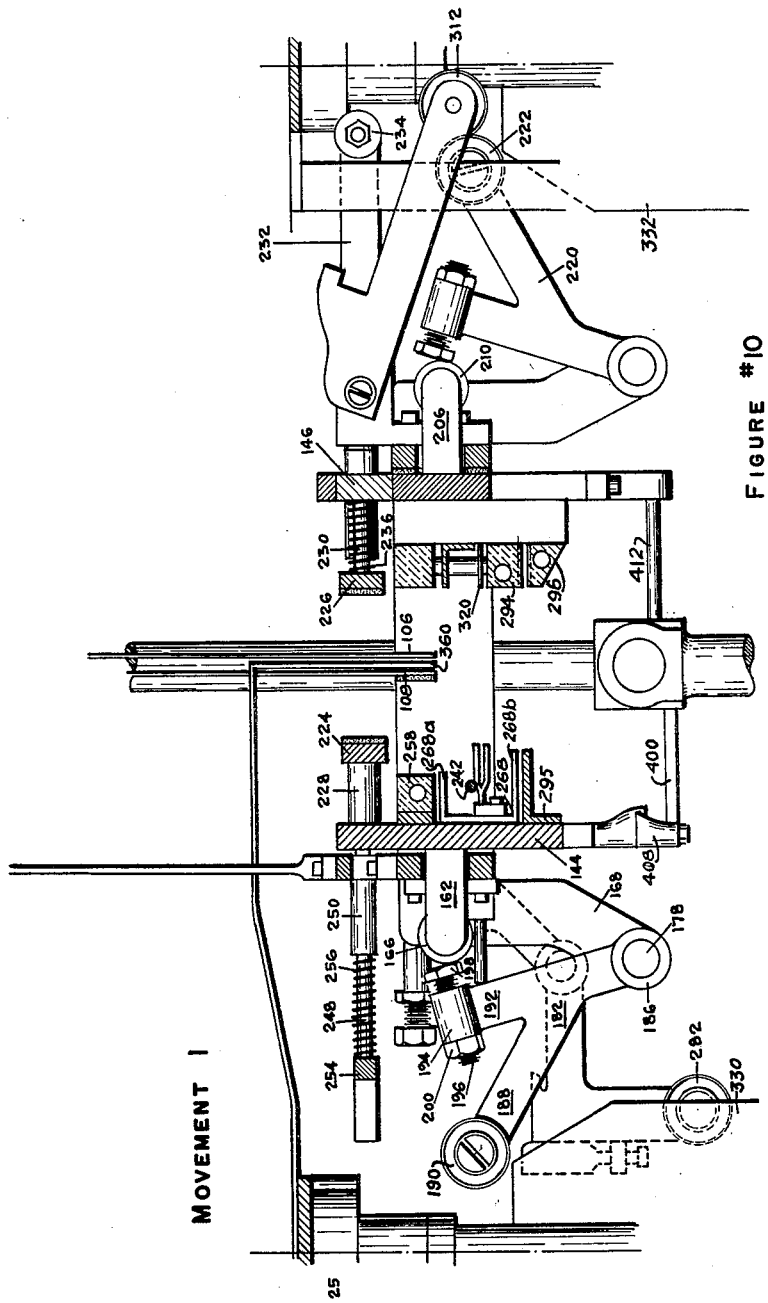
INVENTOR
JAMES B. McCALLEY
BY
ATTORNEY Nov. 14, 1961  J. B. McCALLEY  3,008,278
METHOD AND APPARATUS FOR FORMING, FILLING AND SEALING BAGS
Filed Sept. 11, 1959  17 Sheets-Sheet 8
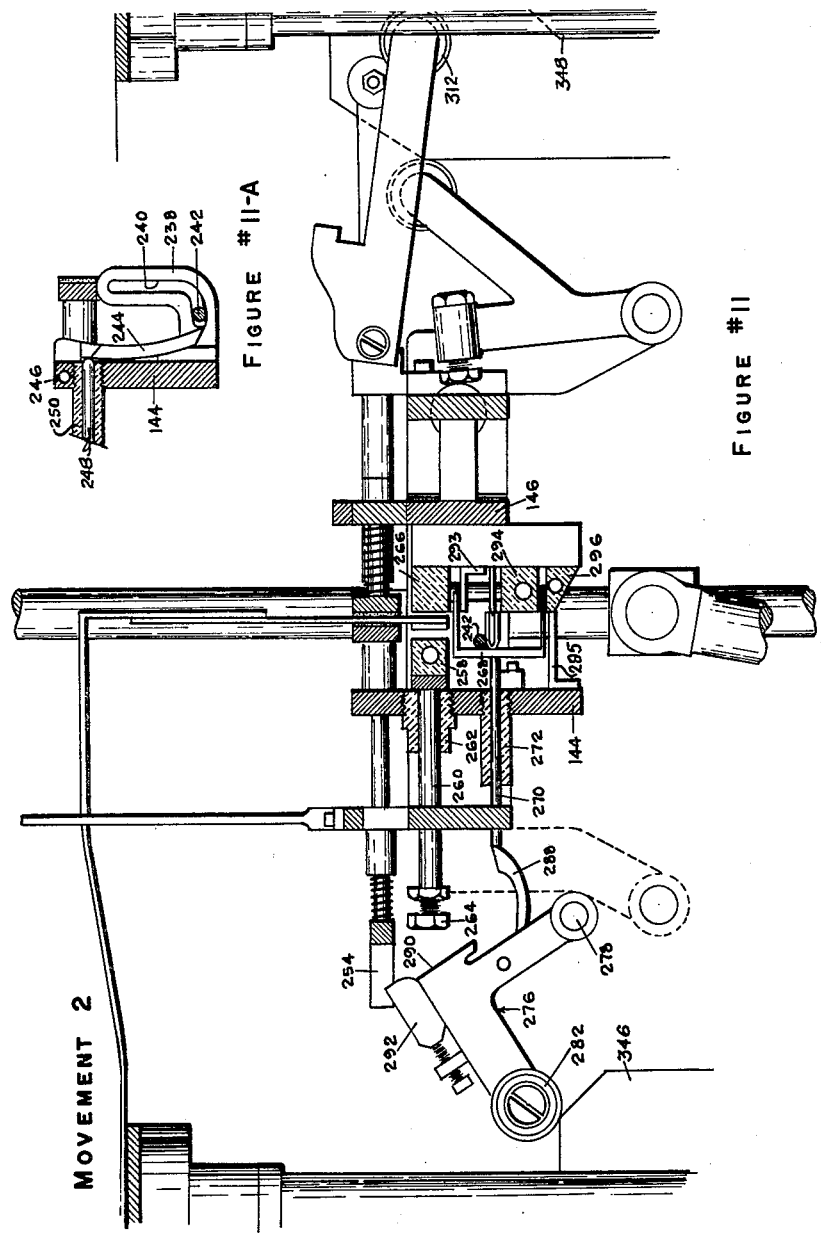
INVENTOR
JAMES B McCALLEY
BY
ATTORNEY

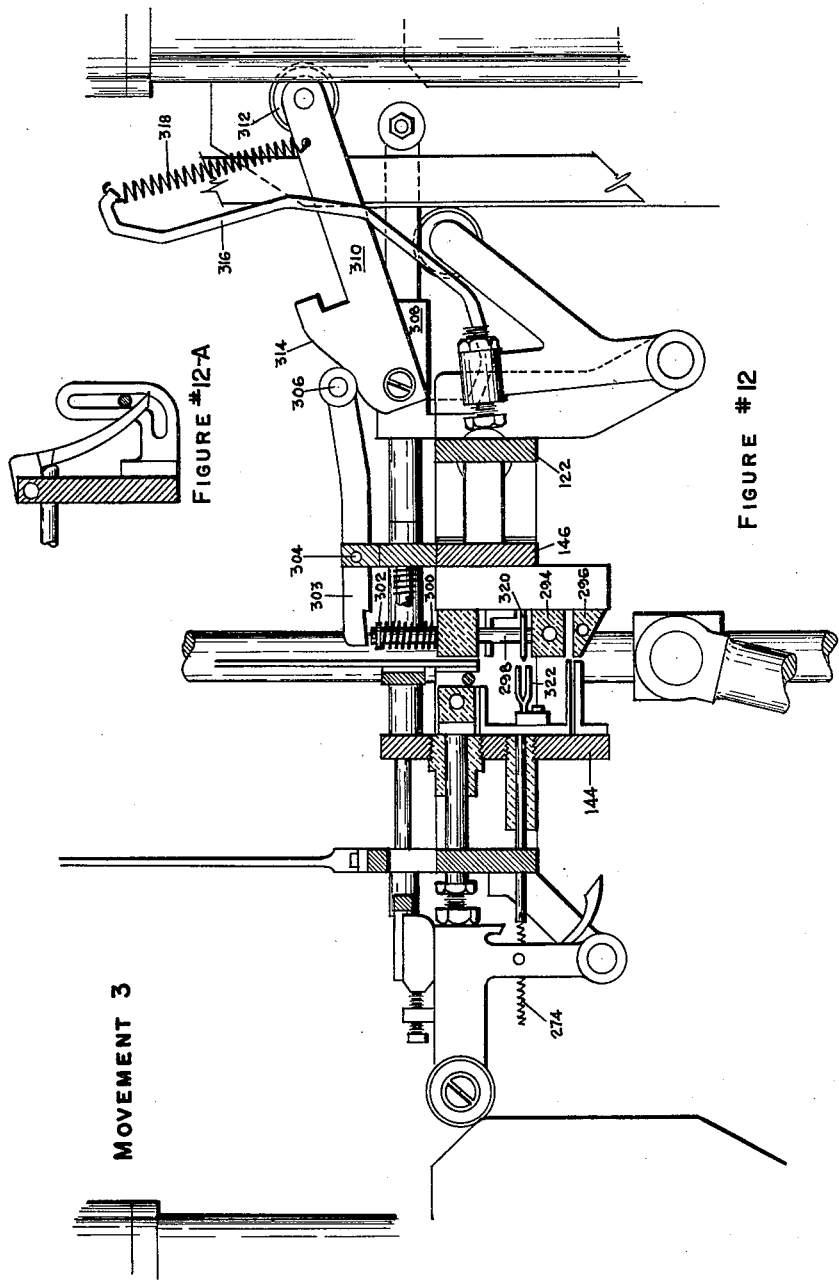

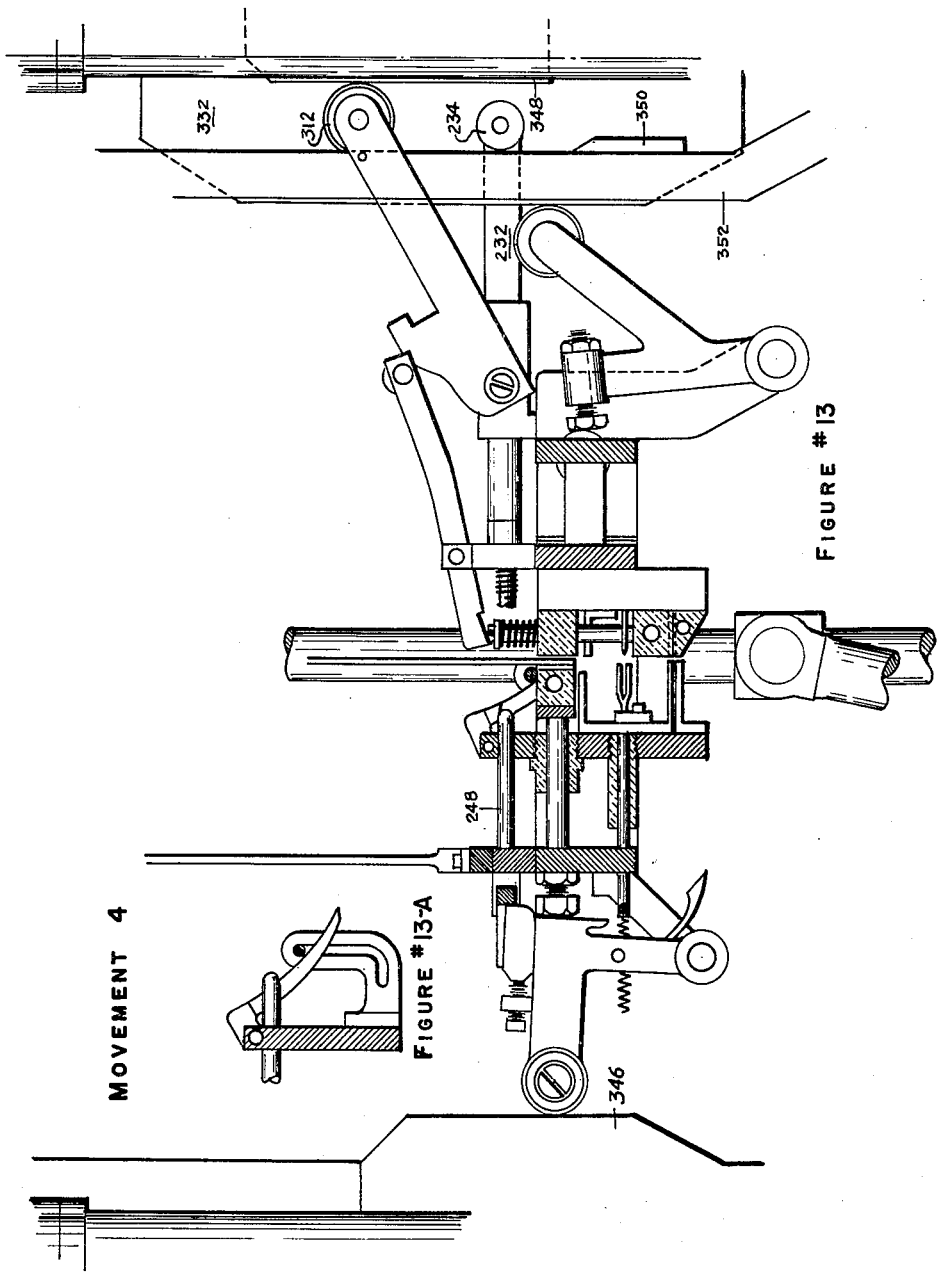

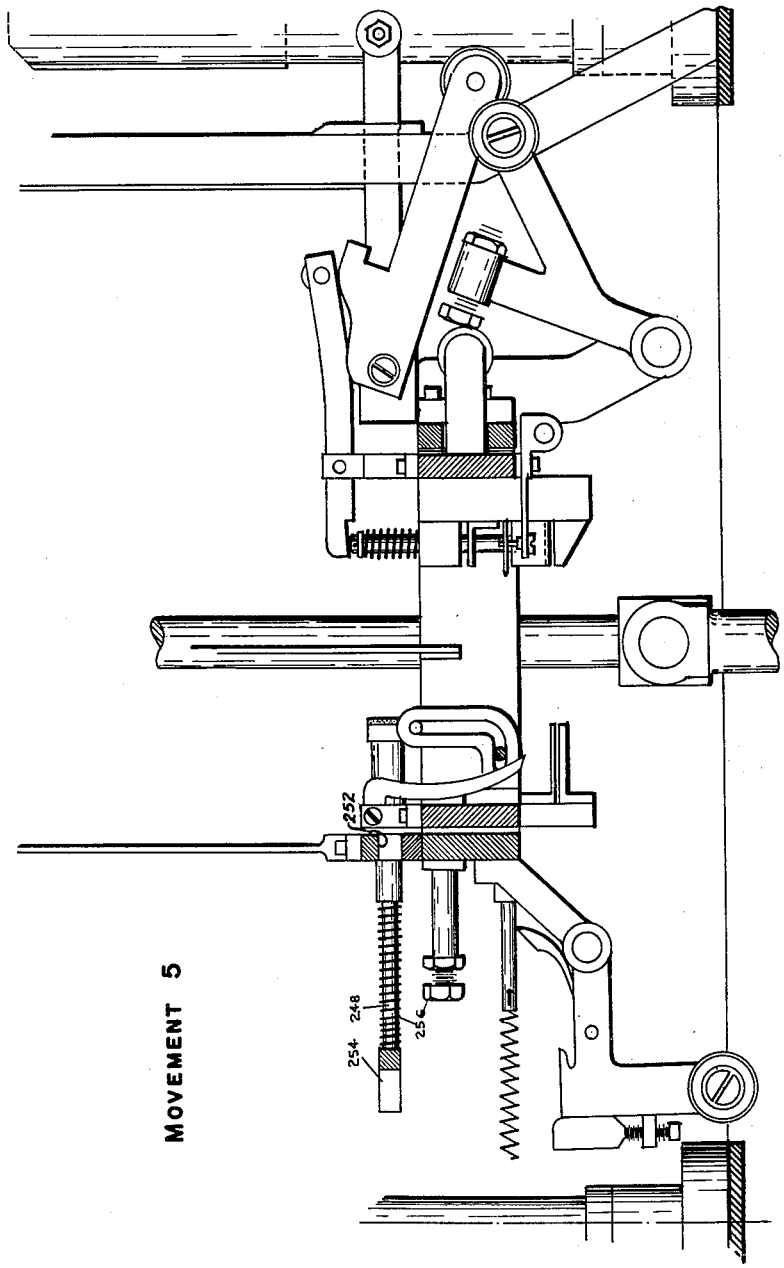

Nov. 14, 1961  J. B. McCALLEY  3,008,278
METHOD AND APPARATUS FOR FORMING, FILLING AND SEALING BAGS
Filed Sept. 11, 1959  17 Sheets-Sheet 12
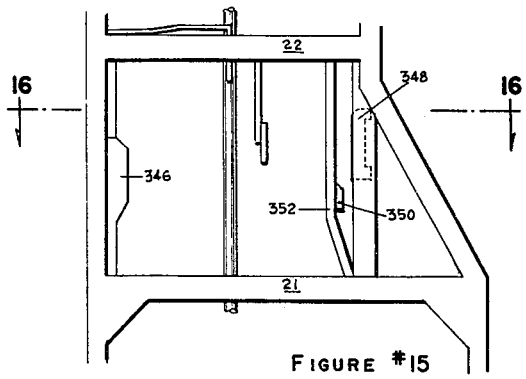
FIGURE #15
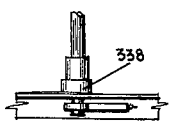
FIGURE #18
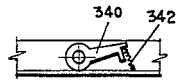
FIGURE #19
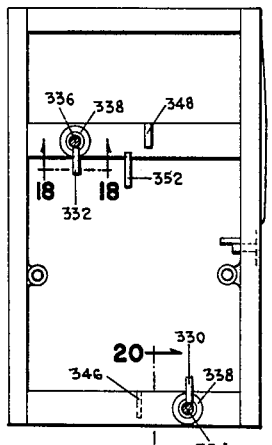
FIGURE #16
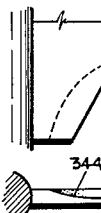
FIGURE #20
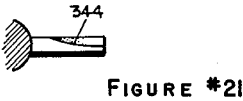
FIGURE #21
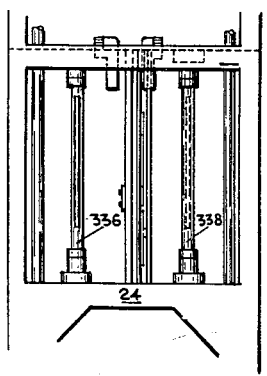
FIGURE #17
Inventor
JAMES B. McCALLEY
By Kenow and Palmer
Attorneys Nov. 14, 1961 J. B. McCALLEY 3,008,278
METHOD AND APPARATUS FOR FORMING, FILLING AND SEALING BAGS
Filed Sept. 11, 1959 17 Sheets-Sheet 13
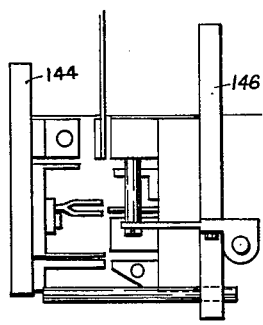
FIGURE #22
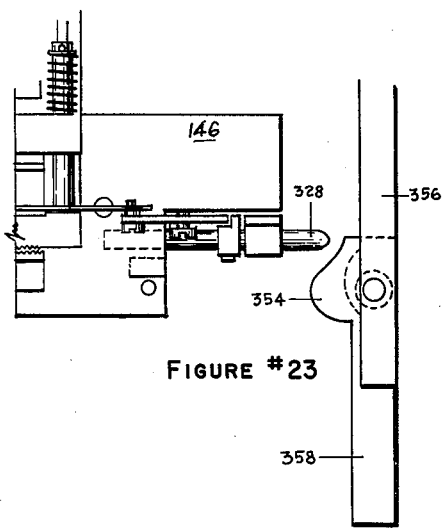
FIGURE #23
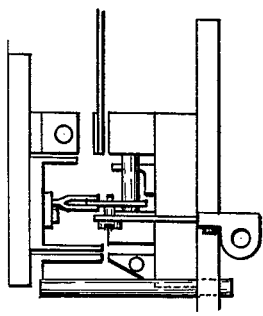
FIGURE #24
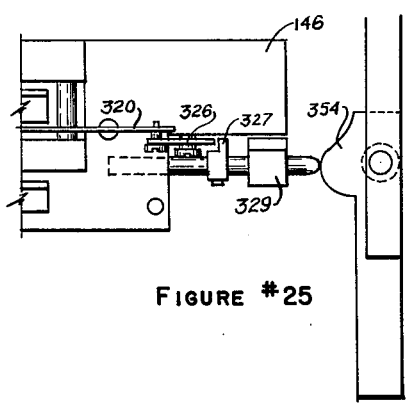
FIGURE #25
INVENTOR
JAMES B. McCALLEY
BY *Kenyon and Palmer*
ATTORNEY

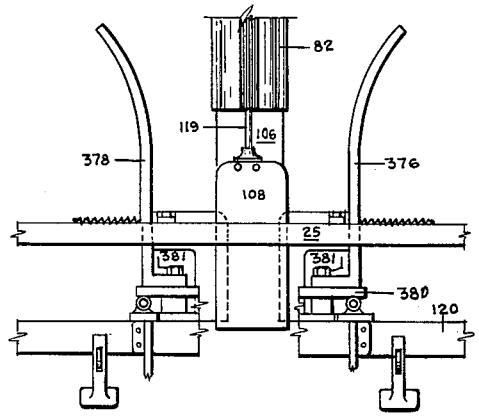
FIGURE #26
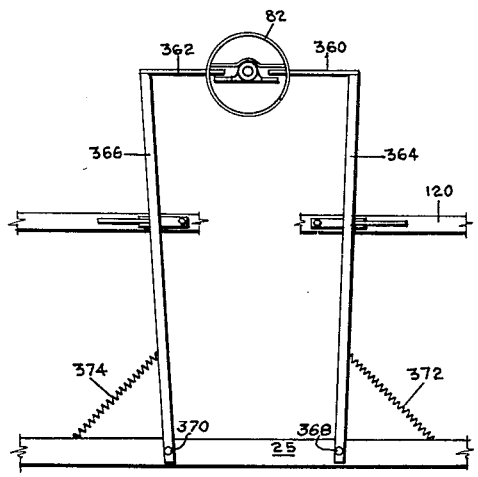
FIGURE #27
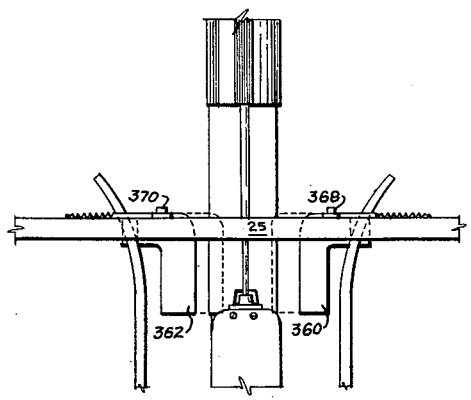
FIGURE #28

Nov. 14, 1961  J. B. McCALLEY  3,008,278
METHOD AND APPARATUS FOR FORMING, FILLING AND SEALING BAGS
Filed Sept. 11, 1959  17 Sheets-Sheet 15
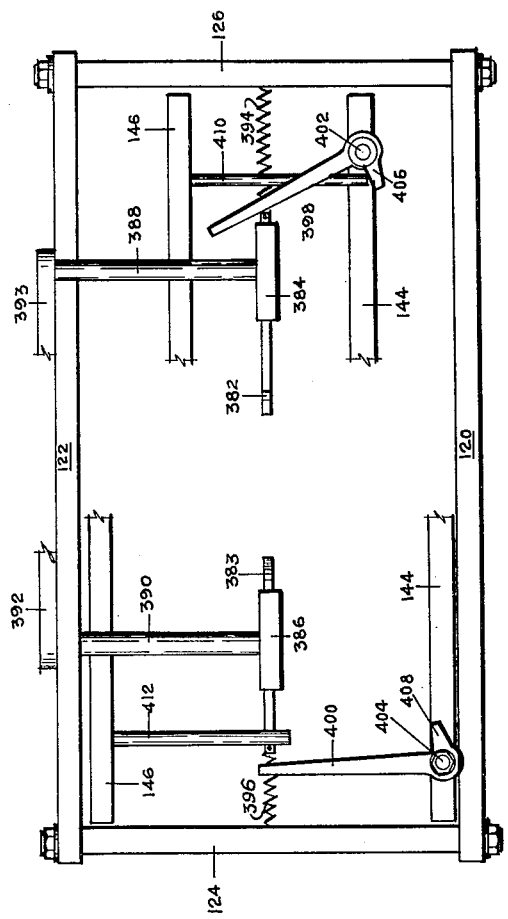
INVENTOR
JAMES B. McCALLEY
BY
ATTORNEY

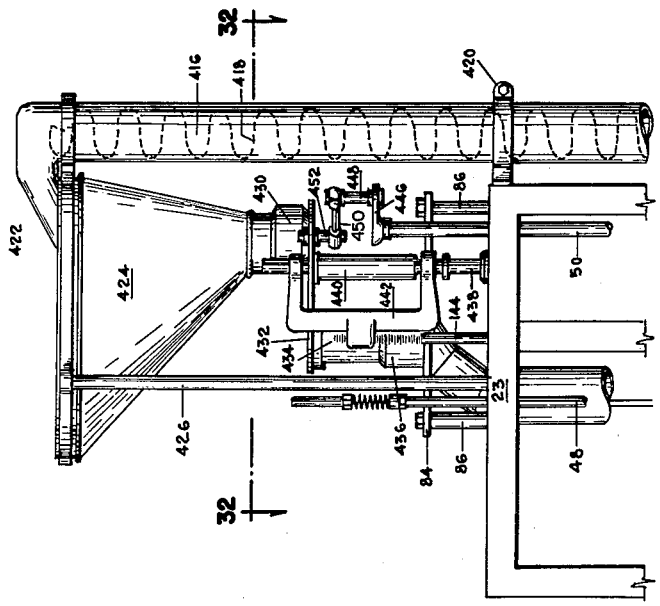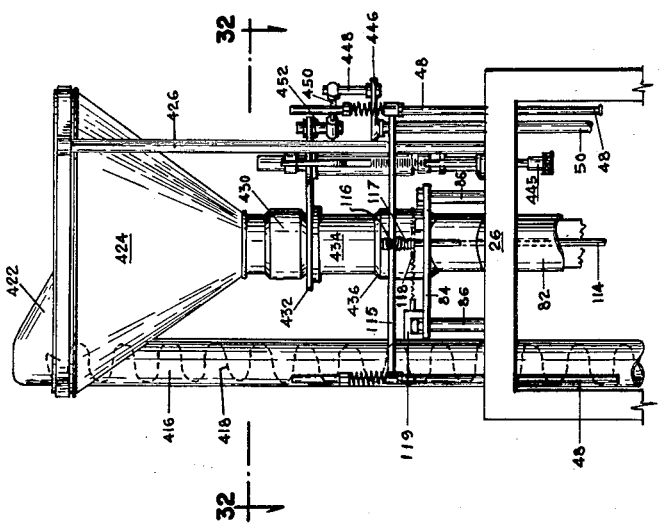

Nov. 14, 1961 J. B. McCALLEY 3,008,278
METHOD AND APPARATUS FOR FORMING, FILLING AND SEALING BAGS
Filed Sept. 11, 1959 17 Sheets-Sheet 17
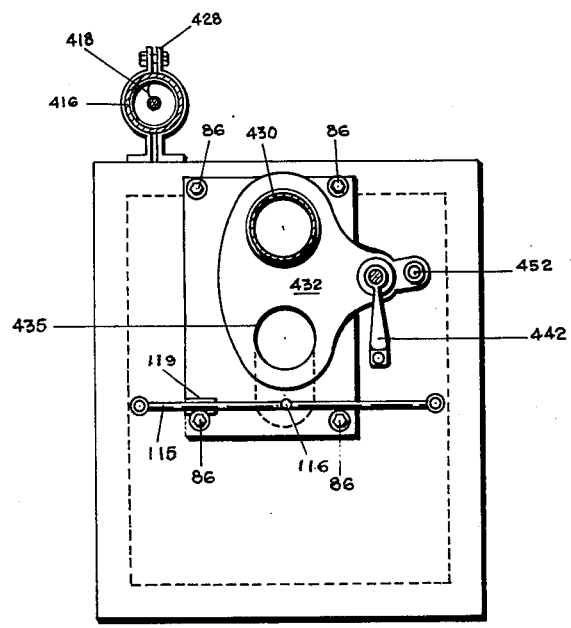
FIGURE # 32
INVENTOR
JAMES B. McCALLEY
BY *Kenorand Palmer*
ATTORNEY United States Patent Office 3,008,278
Patented Nov. 14, 1961

3,008,278
METHOD AND APPARATUS FOR FORMING, FILLING AND SEALING BAGS
James B. McCalley, Calle 45 2401, Alturas de Miramar, Marianao, Cuba
Filed Sept. 11, 1959, Ser. No. 839,527
7 Claims. (Cl. 53—182)

This invention relates to packaging and more particularly to a new and improved method and apparatus for continuously forming, filling and sealing bags from a web of sheet material such as cellophane, wax paper or any other suitable packaging material.

FIELD OF INVENTION

In the packaging of granular or other fluent material, such factors as speed of bag formation, effective closing and sealing of the bag and seams or edges, shielding the material in the bag being formed from damaging temperatures and pressures, and as well, the formation of a strong and attractive bag or package are bases of some of the more critical problems encountered. Concerning speed of bag formation, the use of apparatus by which a web of suitable bag forming sheet material is continuously formed into a tube to permit such successive operations as closing the free end of the tube, introducing the desired quantity of granular or other fluent material, sealing the upper edge of the bag and severing the bag thus formed from the continuously formed tubular portion has been particularly helpful. Generally, to enhance the rate at which completely formed bags may be produced on an apparatus of this type, the sealing action has been performed heretofore, in one operation, i.e., the upper edge of a lower bag and the lower edge of an upper bag are simultaneously heated under pressure to form a sealed zone, which zone is severed centrally to separate one bag from the other. The difficulty with this technique of forming the end seals on the bags, however, is that first, only a single thickness of material is available for each side of the seal since folding the ends of the bags prior to sealing would require a separate and distinct operation, thus decreasing the overall rate of bag formation. Secondly, the strength of such a seal is often far below the strength required to package various materials particularly where rough handling and dense materials are involved.

Also, the problem of obtaining a satisfactory seal at the ends of bags thus formed continuously while at the same time leaving the material therein undamaged by the pressures and temperatures normally incurred in the sealing operation is one which has not been fully solved in apparatus and packaging techniques available to the industry prior to this invention. This problem becomes particularly critical in effecting or forming the top seal on each bag after it has been filled with a predetermined quantity of granular or fluid material since the source of heat normally used to produce this seal necessarily must be located close to the material in order to prevent the formation of only partially filled bags. Also, the seal formed at this point on the bag must be carried out with a minimum of handling since any undue folding and additional operations generally tend to damage the material in the bag.

To maintain the desired rate of bag forming speed, obtain a sufficiently strong seal without in any way damaging the material with which the bags being formed are filled, and at the same time provide a bag or package which is neat in appearance poses an equally difficult task to the packaging industry. In this respect, to achieve a neatly appearing bag, it is necessary if the ends thereof are to be folded to achieve proper strength, to form pleats or gussets in the sides of the bag being formed.

Although the formation of such gussets in bags is known in the packaging industry, their use in the continuous formation of bags is not without difficulty. One of the principal reasons for this is that although the gussets may be readily formed for the sealing of the lower edge prior to filling, the introduction of material into the bag tends to remove any previously formed pleats or gussets. Hence, prior to effective and proper sealing of the upper bag edge, the gussets must be reformed over the level of material in the partially formed bag. In packaging techniques heretofore available, the lack of a satisfactory mode of forming and retaining the gussets often led to omitting them and thereby sacrificing the neat appearance rendered obtainable through their use.

Thus, while in general, the bag forming, filling and sealing techniques available to the packaging industry have, in the past, facilitated the rate at which bagging operations may be performed, many problems have gone unsolved. This is particularly significant in operations where the bags are formed, filled and sealed at the end of a continuously formed tube of bagging material where the speed potentials are great but where the quality of work is questionable for the reasons aforementioned.

OBJECTS

I. A principal object of this invention is to provide a new and unique method of and apparatus for forming, filling and sealing packages such as bags by which the problems heretofore encountered are substantially overcome;

II. Another object of this invention is to provide a method of forming, filling and sealing bags which greatly enhances the appearance of the completely formed bag as well as the strength thereof;

III. A further object of this invention is that of providing an apparatus for completely forming filled bags from a continuously fed web of sheet material wherein substantially all of the bag forming operations are effected by power transmitted through a single rotary shaft;

IV. Another object of this invention is the provision of an apparatus for continuously forming and filling bags wherein the impact of material introduction is sustained completely on the bag forming mechanism and not on the bag material;

V. Another object of this invention is the provision of an apparatus for forming, filling and sealing bags whereby the ends of the bags are folded on themselves and then heat sealed to assure maximum strength;

VI. A further object of this invention is that of providing an apparatus of the referred type wherein highly effective means are provided for forming pleats or gussets in the sides of the bags being formed and as well, for retaining the gussets until the bags are sealed;

VII. Another object of this invention is the provision of an apparatus of the type referred to wherein means are provided for accurately registering the feed of bag forming material with the bag forming operation to enable the use of previously labeled material;

VIII. A still further object of this invention is the provision of an apparatus for forming, filling and sealing bags having gussets in the sides thereof, wherein the obstruction presented to the flow of material introduced into the bags by the gusset forming elements is eliminated such that the feed channel is left unblocked;

IX. Another and more specific object of this invention is that of providing in a machine of the referred type a carriage on which substantially all of the bag forming components are mounted and actuated automatically during movement of the carriage through its bag forming cycle.

Other objects and further scope of applicability of the present invention will become apparent from a detailed description given hereinafter. It should be understood, however, that the detailed description while indicating preferred embodiments of the invention, is given by way of illustration only, since it will become apparent to those skilled in the art from this description that various changes and modifications can be made without departing from the spirit and scope of this invention.

GENERAL DESCRIPTION

In the new and improved packaging technique of this invention, the bag forming, filling and sealing operation is carried out by continuously forming a web of suitable sheet material such as, for example, cellophane, polyethylene, wax paper, and the like into a tube, pleating the sides of the tube to establish gussets therein, and sealing the free end of the tube to form an open top partially formed bag. Thereafter, the partially formed bag is filled with a predetermined quantity of material and clamped along a line above the level of material in the bag and severed at a distance far enough from the clamping to permit folding over and sealing the upper edge of the bag. Prior to the cutting and sealing operations, however, and simultaneously with the clamping of the filled partially formed bags, the gussets previously folded in the tube and pushed outwardly during filling are reestablished so as to be incorporated in the upper seam.

The apparatus for performing this technique and to which this invention relates includes generally a frame, a crank actuated reciprocable carriage mechanism, a combination tubular feed chute and mandrel positioned above the carirage associated with means for forming the web of bag forming material into a tube thereabout and a feeding mechanism positioned on the frame above the tubular mandrel and carriage. The mandrel carries centrally therein a pair of spaced plates which extend past the lower end of the mandrel and one of which is moveable with the reciprocating carriage. A pair of laterally moving plates are oscillatably supported on the frame so as to be insertable between the mandrel carried plates in a manner such that as the tube of bag forming material depends from the mandrel it is caused to be pleated at its sides to effect the formation of gussets therein. The carriage supports means for clamping the lower end of the tube depending from the mandrel as well as means for simultaneously folding the upper edge of a lower filled bag and the lower edge of an upper partially formed bag, separately actuated means for heat sealing these edges, means for severing the completely sealed bag from the partially formed bag tube and pair of fingers engageable with the side of the filled, partially formed bag for reforming the gussets therein after filling and before sealing. Except for the driving of an oscillatable metering feed cup arrangement at the top of the machine which moves from positions between a downwardly discharging hopper and the open upper end of the tubular mandrel for filling purposes, the entire operation of the bag forming elements is effected by the engagement of various cam followers on respective cam plates mounted immovably on the frame. Thus, a complete cycle of operation or a complete bag is formed for each time the carriage moves from its uppermost limit of reciprocation to its lowermost position and back up again. Also, means are provided on the machine for registering the feed of bag forming sheet material with the movement of the carriage to permit the printing of labels on the web prior to the bag forming operation.

A more complete understanding of the new and improved method and apparatus for forming, filling and sealing bags to which this invention relates may be had by reference to the accompanying drawings in which:

FIG. 1 is a front elevation of the machine of this invention, showing the general organization of operating mechanisms thereof;

FIG. 2 is a side elevation of the machine as shown in FIG. 1;

FIG. 3 is an enlarged fragmentary side elevation showing in detail the mechanism of this invention for continuously forming a web of sheet material into a tube;

FIG. 4 is an enlarged fragmentary plan view showing the improved forming and filling tubular mandrel of this invention;

FIG. 5 is a fragmentary cross-sectional view taken along line 5—5 of FIG. 4;

FIG. 6 is a fragmentary cross-sectional view taken along line 6—6 of FIG. 4;

FIG. 7 is an enlarged fragmentary plan view of the carriage mechanism of this invention taken along line 7—7 of FIG. 1;

FIG. 8 is a side elevation of the carriage shown in FIG. 7;

FIG. 9 is a side elevation of the carriage shown in FIG. 7 illustrating the side opposite that shown in FIG. 8;

FIG. 10 is a fragmentary cross-sectional view taken along line 10—10 of FIG. 7;

FIG. 11 is a fragmentary cross-sectional view taken along line 10—10 of FIG. 7, and showing substantially the same carriage mechanism as FIG. 10, but in a different stage of operations;

FIG. 12 is a fragmentary cross-sectional view of the carriage mechanism shown in FIG. 10 but at another stage of operation;

FIG. 13 is a cross-sectional view of the mechanism shown in FIG. 10 at a more advanced stage of operation;

FIG. 14 is a cross-sectional view of the carriage and carriage components shown in FIGS. 10, 11, 12, 13 at its final stage of operation;

FIG. 15 is a fragmentary side elevation showing the respective carriage actuating cams of this invention;

FIG. 16 is a fragmentary cross-sectional view taken along line 16—16 of FIG. 15;

FIG. 17 is a fragmentary front elevation of that portion of the machine shown in FIG. 15;

FIG. 18 is a fragmentary elevation taken along line 18—18 of FIG. 16;

FIG. 19 is a plan view of the machine component shown in FIG. 18;

FIG. 20 is a fragmentary elevation taken along line 20—20 of FIG. 16;

FIG. 21 is a bottom plan view looking up at the machine element shown in FIG. 20;

FIG. 22 is an enlarged fragmentary side elevation showing the cutting knife actuating means of this invention;

FIG. 23 is a front elevation of the knife-actuating means shown in FIG. 21;

FIG. 24 is a side elevation of substantially the same components shown in FIG. 21 but in a different stage of operation;

FIG. 25 is a front elevation of the actuating means shown in FIG. 24;

FIG. 26 is a fragmentary elevation of the gusset folding or pleating mechanism of this invention;

FIG. 27 is a fragmentary plan view of the mechanism shown in FIG. 26;

FIG. 28 is a fragmentary elevation of substantially the same mechanism shown in FIG. 26, but in a different stage of operation;

FIG. 29 is a fragmentary bottom plan view of the carriage shown in FIG. 7 illustrating the gusset reforming fingers of this invention, and as well, the actuating mechanism therefor;

FIG. 30 is an enlarged fragmentary front elevation of the feed hopper and metering apparatus of this invention;

FIG. 31 is a side elevation of the mechanism illustrated in FIG. 30;

FIG. 32 is a cross-sectional view taken along lines 32—32 of FIGS. 30 and 31;

FIG. 33 is an enlarged fragmentary cross section of the carriage mechanism of this invention during the clamping and cutting stage of operation;

FIG. 34 shows substantially the same elements as FIG. 33, but during the initial folding stage of operation thereof;

FIG. 35 shows substantially the same organization as FIG. 33, but in the final folding stage of operation; and FIG. 36 shows substantially the same elements as FIG. 33, but in the final heat sealing phase of operation.

DETAILED DESCRIPTION

General organization and drive mechanism

The general organization of the machine of this invention is shown in FIGS. 1 and 2 in which a frame generally designated by the numeral 10 is provided with a base 12, a pair of vertical upright members 14 and 16 respectively at the front thereof, a pair of rearwardly disposed frame portions designated by the numerals 18, 19 and 20. In addition to being assembled on the base, the front and rear vertical standards of the machine frame are connected by horizontal structural members 21, 22 and 23 and further the two sides of the frames thus established are connected at various levels by the horizontal structural members 24, 25 and 26. Also, a member 27 is provided and extends vertically between the horizontal members 22 and 23 on each side of the frame. The members 27 in turn support a horizontal extending bar 28.

The basic operating components of the machine forming the subject matter of this invention in terms of positions occupied on the frame may be referred to as a mechanism for feeding and measuring a specific quantity of material with which the bags formed by the machine are to be filled, which mechanism is generally designated by the numeral 30; a mechanism for forming a web of cellophane, wax paper or other material into a continuous tube from which the bags are ultimately formed, generally designated by the numeral 32; a vertically reciprocating carriage assembly designated generally by the numeral 34; and a drive mechanism generally designated by the numeral 36. Although the feeding mechanism 30, the tube forming mechanism 32 and carriage assembly 34 will be discussed in more detail hereinafter, the drive mechanism 36 is operated from a rotary input shaft 37 driven by a source of power such as a motor 38. From the shaft 37 the drive is through a gear box 39 to a rotary shaft 40 to which are keyed a pair of cranks 41 which in turn eccentrically carry crank pins 42 at one side of the shaft 40 and weights 44 at the opposite side therefrom for counterbalancing purposes. The pins 42 in turn are journaled in the ends of pitmans 45, which at their upper ends are journaled to bosses 46 on bars 47. One bar 47 is provided on each side of the carriage 34 and secured thereto such that vertical reciprocation of the bars 47 effects an equivalent movement of the carriage 34.

Connected to the carriage and vertically reciprocable therewith are a pair of rods 48 which extend upwardly to the feeding mechanism 30 for purposes which will be described more fully below. Also, for operating the feeding mechanism 30, a shaft 49 is drivingly connected to the gear box 39 to rotate a shaft 50 through link 51. A complete understanding of function of the rods 48 as well as the shaft 50 will be clear from the detailed description which follows below and they are referred to at this point only because of their relation to the drive mechanism.

Also, at this point, it will be noted that a bag discharge chute 52 is mounted in the vicinity of the drive mechanism and under the carriage 34. This chute is for the purpose of carrying the completed bags from the carriage clear of the machine for further handling. Further, it is preferred that this chute be associated with a conveyor, not shown, by which the bags may be automatically handled after their formation.

In the description which follows the feeding mechanism 30, the tube forming mechanism 32 and the carriage assembly 34 will be discussed under respective sub-titles. Since these mechanisms co-act with one another in such a manner that one cannot be appreciated fully without having the other in mind, they will be taken up generally in the order in which they function to form, fill and seal bags.

The tube forming mechanism

As shown in FIGS. 2 and 3 of the drawings, the mechanism for forming a continuous web of bag material into a tube includes a pair of brackets 53 rigidly mounted to each of the frame members 20 and which extend rearwardly of the machine terminating in a pair of bearings 54 for rotatably holding a spool 56 on which the web of material 58 to be used to form the bags is wound. A canvas belt 60 equipped with a weight 62 at the lower end thereof is suspended from the frame members 20 over the spool to insure a sufficient amount of resistance to unspooling of the web to prevent unwieldy slack therein. From the spool, the web is trained over a series of rollers, starting with the roller 64. The ends of the roller 64 are slidably received by angle members 66, which form with the frame members 18 and 19 a channel within which the roller may slide vertically to exert a desired tensioning in the web. The web is then trained over the roller 68, under the rollers 70 and 72 and over a roller 74. From the roller 74 the web is trained downwardly about roller 76 and is caused to pass a photoelectric cell designated by the numeral 78. The purpose of this cell is to enable registry of the labels printed or otherwise formed on the web to the bags as they are formed and the details thereof will be more fully explained hereinafter. From the roller 76, the web is trained over a curved surface collar 80 and thence downwardly about a tubular feed chute and mandrel 82.

The mandrel 82 is suspended from the top of the machine and more particularly from the apertured plate 84 suspended or carried on standards 86 mounted in the top of the machine frame as shown in FIGS. 1 and 2. The lower portion of the mandrel 82 is afforded stability to some extent by a circular collar 88 having a flanged base portion 90 so that it may be bolted, riveted or otherwise affixed to the crossbar 28 of the frame. The collar 88 fits loosely about the chute 82 so as to form an annulus through which the bag material may pass. Thus, it will be seen that the combination of the curved collar member 80, the tubular mandrel 82 and the collar 88 cause the web of bag material 58 to be continuously formed into a tube 58a.

Positioned immediately below the collar 88 on the periphery of the mandrel 82 is an elongated slightly projecting member designated by the numeral 92 in FIGS. 4 and 5 and having a serrated but generally flat outer surface. A pivotable heat sealing member 94 is supported adjacent the projecting member 92 on a shaft 96 journaled in a bearing sleeve 98, which in turn is supported by a rod 100 extending perpendicularly thereto and affixed to the cross member 28 of the frame. The shaft 96 on which the heat sealing member 94 is carried is provided with a radially extending arm 102 to which one end of a spring 104 is attached. The opposite end of the spring 104 is affixed to the frame under tension so that the heat sealing member 94 is biased about its pivot into engagement with the serrated surfaced member 92. It will be noted that the inwardly facing surface of the heat sealing member is serrated to conform with the serrations on the member 92. The width of bag material and the diameter of the mandrel 82 are so established that when the bag material 58 is formed about the mandrel, the edges thereof overlap substantially the width of the member 92 and the heat sealing member 94, thus enabling a continuous seal of the tubular bag material as it passes the members 92 and 94.

Centrally positioned within the mandrel 82 are a pair of plates 106 and 108, both of which extend substantially diametrically across the tubular mandrel 82. Plate 106 is held stationary within the tube by a pair of bracket members 110 and 112. The plate 108 on the other hand is suspended at the bottom end of a vertically reciprocable rod 114 which is slidingly received in centrally positioned apertures on the brackets 110 and 112 respectively. Thus, as will be seen from FIG. 4, the plates 106 and 108 are spaced slightly from one another to establish an elongated narrow opening in a plane diametrically across the mandrel or chute 82. The purpose of these plates is to enable the formation of gussets or folds 58b in the sides of the bags being formed which will be described in more detail below.

To effect vertical reciprocation of the plate 108 with the carriage 34, the rod 114 is suspended at its upper end from a horizontal beam 115 (see FIG. 30), which in turn, is adjustably carried at the upper ends of rods 48. Preferably, the rod 114 is resiliently attached to the beam 115 by tension spring 116 so that normally, movement of the rod is the same as the beam and thus the carriage 34, but when desired, movement of the rod 114 and plate 108 may be stopped while the carriage 34 continues to move for purposes of adjusting the web 58 with respect to the carriage to be described more fully hereinafter. It will be noted that the upper end of the rod 114 is provided with coarse threads or a notched portion 117 and that this portion is located within a clamping member 118. A solenoid 119 is mounted on the stationary platform 84 to actuate the clamp 118. Since the clamp is also mounted on the platform 84, actuation thereof to grip the portion 117 of the rod 114 will stop movement of the plate 108, even though the carriage 34 and beam 115 continue to move through a limited distance. The solenoid 119 is electrically connected to the photoelectric cell 78, by wires not shown.

*The carriage mechanism*

The details of the carriage 34 are illustrated most clearly in FIGS. 7 through 10. Referring to FIG. 7 in which a plan view of the carriage is presented, it will be noted that the carriage is provided with a pair of front and rear frame plates 120 and 122 respectively and a pair of side frame plates 124 and 126. As shown in the drawings, the side frame members 124 and 126 are connected at their ends to the ends of front and rear frame plates 120 and 122 by bolts 128, though it is obvious that other connecting means such as riveting, welding or the like could be used in place of the bolts 128. Affixed to the side plates 124 are a pair of exteriorly projecting bosses 130 and 132, each having apertures 134 and 136 for engagement with the bars 47 vertically slidable in the frame 10 as shown in FIGS. 1 and 2.

Extending from the front carriage plate 120 to the rear carriage plate 122 are a pair of bars 140 and 142. These bars slidably support a pair of front and rear actuating plates 144 and 146 respectively. As will be seen, the front actuating plate 144 is provided with a pair of rearwardly facing sleeves or bushings 148 and 150 welded or otherwise secured thereto to enable reciprocation of the front plate along the bars 140 and 142. Correspondingly, the rear actuating plate 146 is provided with a pair of forwardly facing bearing sleeves 154 and 156 to accommodate sliding movement thereof along the bars 140 and 142. Normally, the actuating plates 144 and 146 are retained in a position toward the front and rear of the carriage respectively as shown in FIG. 7 by a pair of helical compression springs 156 and 158, each abutting at their ends against the ends of the actuating plates and retained axially thereon by engagement with the bearing sleeves affixed thereto. Extending forwardly of the front actuating plate 144 is a pair of elongated bosses 160 and 162 which may be welded, molded or otherwise affixed to the exterior or forwardly facing surface of the actuating plate 144. These bosses extend through apertures in the front carriage frame member 120 and support at their outwardly facing ends a pair of rollers 164 and 166.

To effect inward movement of the actuating plate 144, an oscillatory cam follower arrangement is provided as best illustrated in FIGS. 8 and 10 in conjunction with the plan view of FIG. 7. Referring to FIG. 8, there is shown a pair of downwardly extending bracket members 168 and 170 affixed at their upper ends to the exterior surface of the front frame plate 120 of the carriage by bolts 172 though other means for fixing the brackets to the carriage frame such as welding or riveting may be also used. The lower end of the brackets 168 and 170 terminate in a pair of cylindrically shaped bearings 174 and 176 formed integrally on the brackets 168 and 170 respectively. Received by the bearings 174 and 176 is a shaft 178 carrying at one end, an arm 180 and at the other end a follower arm 182, both of which are splined, keyed or otherwise affixed non-rotatably to the shaft 178 through cylindrical bosses 184 and 186, respectively, at their lower ends. As shown in FIG. 10, the follower arm 182 is formed having an outwardly facing portion 188 for carrying a follower roller 190 and a straightly extending portion 192 having a cylindrical internally threaded portion 194 at its end for receiving a bolt 196 having a head 198. The bolt 196 is adjustable within the cylindrical member or end 194 and may be locked in any desired adjusted position by a nut 200 positioned at the forward end of the bolt. Thus, it will be seen that oscillatory movement of the follower arm 182 about the axis of shaft 178 will carry the head 198 of bolt 196 into engagement with the roller 166 on the forwardly extending boss 162 to urge the actuating plate 144 inwardly against the bias of springs 156 and 158. The arm 180 at the opposite end of shaft 178 is similarly provided with an internally threaded cylindrical portion at its upper end for receiving a bolt 202 engageable with the roller 164 on the boss 160 at the other side of the actuating plate 144. Since both the follower arm 182 and the arm 180 are non-rotatably mounted on the shaft 178 any movement of the follower arm 182 will necessarily result in a corresponding movement of the arm 180.

Referring again to FIG. 7, it will be noted that the rearwardly disposed actuating plate 146 is similarly provided with a pair of rearwardly extending bosses 204 and 206 carrying rollers 208 and 210 respectively. The mechanism for moving the rear actuating plate inwardly is substantially identical with that for moving the front actuating plate 144 inwardly as will be seen by a comparison of FIG. 8 with FIG. 9. As shown in FIG. 9, a pair of downwardly extending brackets 212 and 214 are affixed to the rear frame member 122 and carry rotatably at their lower end a shaft 216. The shaft 216 carries non-rotatably at each of its ends, arms 218 and 220. The arm 220 is provided at its upper end with a follower roller 222, as shown in FIGS. 9 and 10, and since the operative association of the arms 218 and 220 with the rearwardly extending bosses 204 and 206 on the rear actuating plate 146 is the same as that of the front plate 144, no further explanation of this mechanism is deemed necessary.

Referring now to the mechanisms which are carried by the horizontally reciprocating actuating plates 144 and 146, we note first the provision of clamping jaws 224 and 226. The jaw 224 is carried at the end of a horizontal stud 228 which is rigidly mounted on the front actuating plate 144, such as being welded, bolted or otherwise affixed thereto. The jaw 226, on the other hand, is carried at the end of a rod 230 slidably received by the actuating plate 146 and operably associated with a cam follower arm 232 having at its end a follower roller 234. A helical compression spring 236 is positioned between the clamp 226 and actuating plate 146, thus tending to urge the clamping jaw 226 centrally of the carriage.

Also carried on the inside of actuating plate 144 is a pair of generally L-shaped brackets 238, each having a cam slot 240 for holding the respective ends of a folding bar 242. Generally, the organization of this mechanism can be best understood by referring to FIGS. 7, 11A and 14. As will be seen in these figures, the folding bar 242 is movably supported within the slots 240 of the holders 238 and movement thereof is effected by a pair of downwardly extending curved actuating fingers 244 pivotally supported at their upper ends in brackets 246 bolted or otherwise affixed at the upper edge of the actuating plate 144. Movement of the pivotable folding bar actuating fingers is effected by a horizontally reciprocating bar 248 supported in a sleeve 250 for movement through an aperture 252 in the front carriage frame member 120. The forward end of the rod 248 is arranged to urge against the actuating fingers or members 241 beneath the pivotal support thereof while the other end of the rod 248 is equipped with a yoke 254. A helical compression spring 256 is interposed between the yoke 254 and bearing sleeve 250 so as to hold the rod 248 normally toward the front portion of the carriage.

For the purpose of heat sealing the bottom seam of an upper bag which will be more fully understood in conjunction with the sequence of operation to follow below, an electrically heated plate 258 is provided at the interior end of a rod 260 slidably received within bushing 262 in the front actuating plate 144 as seen in FIG. 11. A bolt 264 is threadedly received in the outer or front end of the rod 260 so that the extent of travel of the heater plate 258 can be adjusted. In order that a sealing operation may be effectively carried out by the heating plate 258, a back-up mandrel 266 is carried by the rear actuating plate 146. Thus, it will be seen that the tube of bag material on both sides of the vertically reciprocable plate 108 may be firmly gripped between the heating plate or jaw 258 and the mandrel 266.

Positioned immediately below the reciprocable heating jaw 258 on the front actuating plate 144, is a folding channel 268 having upper and lower horizontally extending folding blades 268a and 268b and carried at one end of a rod 270 slidably received within a bushing 272 which in turn is carried by the front actuating plate 144.

From the foregoing it will be noted that the folding bar actuating rod 248, the heat sealing jaw 258 and the folding channel 268 are movable independently of the front actuating plate 144. All three of these members are independently actuated at the proper time by a bell crank follower arm 276 pivotally mounted at one end about a shaft 278 in turn carried by a bracket 280 which is fixed at the front side of front carriage frame member 120. At the other end of the bell crank follower arm 276 is journaled a follower roller 282. Referring to FIG. 8 it will be noted that the shaft 278 carries a torsion spring 284 anchored at one end to bracket 280 and at the other end to the bell crank follower arm 276. The purpose of this spring is to retain the follower arm 276 in a downward position substantially as shown in FIGS. 10 and 14. The follower crank 276 carries on its lower or pivotal leg a finger 288, having a curved configuration and operable with the folding channel folding bar 270 to provide instantaneous actuation thereof. The central portion of the follower crank 276 is provided with a hammer-like surface 290 which cooperates with the adjustment nut 264 on the end of the heater plate supporting bar 260 to effect actuation of the heater plate or jaw 258. Further, the upper arm of the bell crank follower 276 carries an adjustable slidable stop 292 for engagement with the yoke 254 at the forward end of the folding rod actuating bar 248.

For cooperating with the folding channel 268, there is provided on the rear actuating plate 146 under the heating plate back-up mandrel 266 a generally L-shaped member 293 spaced sufficiently from the back-up mandrel 266 that the upper arm of the folding channel may enter into the space and effect a fold in the lower portion of an upper bag being formed, as will be more readily understood upon reading the operational principles of this invention to follow. Another L-shaped member 295 is similarly mounted on the front actuating plate 144 below the folding channel 268.

A pair of heating elements 294 and 296 are carried on the rear actuating plate 146 for the purposes of heat sealing the upper seam of the lower bag being formed. The lower of the two heating jaws 296 is non-movable with respect to the rear actuating plate 146 while the upper heating jaw 294 is reciprocable vertically with respect thereto. The upper heating jaw 294 is carried at the lower end of a pair of vertically disposed rods 298 which extend through apertures in the back-up mandrel 266 and retained at a normally spaced position with respect to the lower heating jaw 296 by a helical compression spring 300 acting between the top of the back-up member 266 and the pin and collar arrangement 302 at the upper ends of the rods 298. Actuation of the jaw 294 is effected by a lever arm 303 pivotally connected to the rear actuating plate 146 as by pin 304 and carrying at its opposite end a roller 306. A bracket 308 carried on the rearward side of the rear carriage frame member 122 forms a pivotal support for a follower arm 310 having at its rearwardmost end a follower roller 312. The forward end of the arm 310 is formed having a cam surface 314 engageable by the follower roller 306 on the lever arm 302. Further, a strut 316 is affixed to the rear carriage frame plate 122 to receive a tension spring 318 to resiliently bias the follower arm 310 in a generally upward direction.

Also carried on the rear actuating plate 146 is a transverse cutting knife 320 cooperable with a bifurcated or channel member 322 mounted on the front actuated plate 144. As shown in FIG. 7, the knife 320 is formed having a pair of angular cam surfaces 324 engageable with the vertically disposed heater jaw carrying rods 298 such that when the knife blade 320 is moved in the direction of its longitudinal axis an oblique cutting movement is effected. One end of the knife blade 320 is retained by helical tension spring 325 while the other end is associated with a lever 326 pivotally received at the bottom of the rear actuating plate 146 and engageable with an upstanding lug 327 adjustably secured on a slidable actuating rod 328. As illustrated in FIGS. 22 through 25 of the drawings, the rod 328 is slidably supported in a bearing guide member 329 suitably affixed to the rear actuating plate member 146. Thus, reciprocation of the rod 328 and lug 327 thereon effects pivotal movement of the lever 326 to cam the knife 320 forwardly on rods 298.

*Carriage actuating cams*

Referring now to FIGS. 15 through 25 of the drawings, there is shown the organization of cam plates with which the machine of this invention is equipped to be followed by the several followers referred to above and thereby actuate the operative components of the carriage 34 as it travels downwardly to effect the cycle of operation. The principal cam plates designated by the numerals 330 and 332 are arranged to be followed by follower rollers 190 and 222, respectively, thus, to effect inward movement of the actuating plates 144 and 146. The cams 330 and 332 are both pivotally mounted on shafts 334 and 336, respectively, the ends of which are received in journals 338 anchored to the various frame members. Referring to FIGS. 18 and 19, it will be noted that the bottom ends of both shafts 334 and 336 non-rotatably carry a lever arm 340 resiliently held in position by a spring 342. Further, it will be noted that the bottom of the cam plates 330 and 332 are provided with cam surfaces indicated at 344 in FIGS. 20 and 21. Thus, it will be understood that under the influence of lever arm 340 and spring 342 the cams 330 and 332 will be held normally perpendicular to the carriage substantially as shown in FIG. 16. Upon completion, however, of the downward travel of the carriage 34, the rollers 190 and 222 will pass the bottoms of cams 330 and 332, and on the upward thereof will engage the surfaces 344 to swing the cam plates clear. Thus, on upward travel of the carriage 34 there will be no camming of the roller followers 190 and 222 by cams 330 and 332, respectively.

Although the full operation and effect of these cam plates will not be understood until read in conjunction with the description of operation which follows, it will be noted here that a cam 346 is arranged to be followed by the follower roll 282 while a cam 348 is positioned to be followed by the roll 312. Further, a cam 350 mounted on a vertical strut 352 is adapted to be followed by the roll 234 on the end of the follower arm 232.

In order to effect actuation of the knife 320, a cam plate 354 is provided pivotally supported at the lower end of a vertical strut 356, which in turn is suspended at its upper end from frame member 22. The cam 354 is positioned to be followed by the knife actuating follower 328 and formed integrally with the cam is a downwardly extending portion 358. The shape of the cam 354 and the weight of the portion 358 are so correlated that as the follower 328 passes downwardly with the carriage 34 no pivotal action of the cams takes place, and accordingly, the follower is urged to the left as shown in FIG. 25. Upon upward movement of the carriage and follower rod 328, however, the weight of the downwardly extending portion 358 is overcome and the cam 354 pivoted upwardly so as to be ineffective to actuate the follower rod 328 and thus the knife 320.

Gusset forming mechanism

In FIGS. 26 through 29 there is shown in detail the improved mechanism of this machine for forming inwardly turned pleats or gussets in the bag tube 58a as it is being formed. These gussets are commonly known to those familiar in this art and are shown at the initial stage of their formation as 58b in FIG. 6. The essential parts of this mechanism reside in the provision of generally inverted L-shaped plates 360 and 362 depending from the ends of supporting struts 364 and 366, respectively. As can be seen from FIG. 27, the struts 364 and 366 are pivotally supported for movement in a horizontal plane on the frame member 25 by pins or bolts 368 and 370. The plates 360 and 362 are normally urged or biased outwardly from each other by helical tension springs 372 and 374, respectively. To insure that the plates 360 and 362 will be held inwardly between the plates 106 and 108 depending concentrically within the tubular mandrel during desired portions of the cycle of operation, the front carriage frame member 120 is arranged to support a pair of upstanding curved camming fingers 376 and 378 on a block 380 retained in position by bolts 381, though it is to be understood that other means for fixing the camming fingers 376 and 378 to the carriage frame may be readily used.

Thus, since the camming fingers 376 and 378 are mounted on the carriage 34, when the carriage is in its upwardmost position of travel or in the position occupied in the beginning of the bag forming cycle as will be more fully understood from the description of operation given hereinafter, the plates 360 and 362 will be positioned between the plates 106 and 108 substantially as shown in FIG. 27. Also, as will be remembered from the description of the tube forming mechanism, the tube of bag forming material 58a passes from the mandrel 82 over both plates 106 and 108. Because of the L-shaped plates 360 and 362, however, the sides of the tube of bag forming material are folded into the space between the plates 360 and 362 to initially form or establish the gussets 58b which are essential to the forming of a neat and attractive seal at both ends of the bags.

From the foregoing it will be understood that the bag gussets 58b are initially folded by the cooperation of the plates 360 and 362 with the plates 106 and 108 in the mandrel 82. However, as the carriage moves downwardly through its cycle, the L-shaped fingers move out and away from the plates 106 and 108 so that upon filling the bag, the gussets thus initially formed are pushed outwardly and temporarily rendered non-effective. To overcome this problem a pair of fingers 382 and 383 are slidably carried within ways 384 and 386, respectively, positioned beneath the carriage 34 but supported thereon. The ways 384 and 386 are supported on horizontal rods 388 and 390, respectively, (see FIG. 29) which in turn are anchored at their outer ends in a pair of diagonally depending braces 392 and 393 riveted, bolted, welded, or otherwise affixed to the exterior of rear carriage frame member 122 as can be seen in FIG. 9. The fingers 382 and 383 are biased outwardly from the center of the carriage by tension springs 394 and 396 respectively.

To move the fingers 382 and 383 against the spring bias and toward the center of the carriage, a pair of pivotal cranks or levers 398 and 400 are provided and pivotally supported on bolts 402 and 404 depending from the bottom of actuating plates 144. Each of the levers 398 and 400 is equipped with an integrally formed radial stop 406 and 408 respectively located in a plane slightly above the plane in which the levers themselves are located. To actuate the levers 398 and 400 and thus move the fingers 382 and 383 inwardly against their spring bias, a pair of pins 410 and 412 are mounted on the rear actuating plate 146 in a manner such that as the plates 146 and 144 are brought together the ends of the pins 410 and 412 engage the radial stops 406 and 408 to move the levers 398 and 400 against the end of the fingers 380 and 382. Correspondingly, the fingers 382 and 383 are urged inwardly toward the center of the carriage 34 and thus the bag to reform or reestablish the gussets in the bag. The actuation of these members is arranged to occur at intervals precisely synchronized with the other elements of the machine as will be fully described in the description of operation which follows.

Filling mechanism

The filling mechanism generally designated by the numeral 30 in FIGS. 1 and 2 is shown in considerably more detail in FIGS. 30 through 32 of the drawings. Structurally, this mechanism incorporates a substantially vertical material elevating tube 416 enclosing a conveying screw 418 which may be rotatably driven by any suitable source of power, not shown. The tube 416 and conveying screw 418 positioned concentrically therein are supported on the frame 10 such as by a bracket 420. The tube 416 terminates at its upper end in a spout 422, directed downwardly into a feed hopper 424, which is of a generally inverted conical configuration, though it will be understood that other suitable hopper configuration may be used. To support the hopper 424 properly in position, an upstanding standard or rod 426 is mounted on the top of the frame 10 and engages at its upper end a bracket 428, which in turn is in engagement with the upper annular edge of the hopper 424.

The bottom of the hopper terminates in a downwardly projecting cylindrical portion or chute 429 over which is telescopically received a tubular extension 430. A feed plate 432 oscillatable in a horizontal plane engages the lower edge of the tubular extension 430 though slidable with respect thereto and carries a depending metering cup or tube 434 beneath an aperture 435 on one side to permit communication of the cup with the tubular extension 430 at desired intervals. A metering cup sleeve 436 is telescopically received over the metering cup 434 in a manner similar to the tubular extension 430 and is supported at its lower edge on the plate 84. It will be remembered that the tubular mandrel 82 about which the bag forming material is formed terminates at its upper end also in the plate 84. Thus, it will be understood that an oscillatory movement of the feed plate 432 about the proper axis will effect travel of the metering cup or tube and its telescopic sleeve 436 from a point beneath the tubular extension of the hopper outlet 429 to a point over an aperture in the plate 84 communicating with the upper end of the tube 82. Since the metering cup is open at its top through the aperture 435 in the feed plate 432 and closed at its bottom only by the plate 84, it will be apparent that movement of the cup from a point beneath the hopper discharge chute extension 430 where it is filled to the opened top of the mandrel 82 in the plate 84 where it is emptied will effect a transfer of a specific quantity of material from the hopper 424 to the tubular mandrel 82 as established by the capacity of the metering cup.

Oscillatable movement of the feed plate 432 is effected about rod 438 mounted vertically on the top of the frame 10. Further, the plate 432 is vertically adjustable on the post 438 to permit varying the quantity of material metered by the metering cup 434 and thus ultimately fed to the bag being formed. This is possible because of the telescopic extensions or sleeves 430 and 436 on the hopper outlet 429 and the metering cup 434 respectively. To permit this controlled vertical adjustment of the plate 432, it is pivotally supported on the post 438 through a bearing tube or sleeve 440. The sleeve 440 is in turn supported at its lower edge by a generally C-shaped adjusting holder 442 threadingly engaging the upper end of a rotatable adjusting shaft 444. An adjusting knob 445 is shown mounted at the lower end of the rod 444 to facilitate rotation thereof. Accordingly, it will be understood that movement of the holder 442 upwardly or downwardly depending on the adjustment of the rod 444 will carry the feed plate 432 to various vertical positions, thereby regulating the capacity of the metering cup 434.

Means for oscillatably driving the feed plate 432 consists of a driving crank 446, link 448, a secondary crank 450 and a shaft 452 rotatably received in that portion of the feed plate 432 opposite the metering cup 434 from the pivot shaft 438. The crank 446 and linkage carried thereby is mounted at the top of the rotary shaft 50 which extends downwardly to the gear box 39 as explained above and synchronized with the overall drive so that movement of the metering cup 434 between the hopper outlet 429 and the tube 82 may be accurately synchronized with the operation of the carriage supported bag forming mechanism as described above.

OPERATION

The operation of the bag forming and filling machine of this invention can be largely understood by following in detail the movement of the various mechanisms on the carriage 34 since a complete cycle of operation is effected by movement of the carriage from its starting point or upwardmost point of travel, downwardly and back to its starting point. In other words one cycle of operation occurs for each revolution of the rotary shaft 40 and cranks 41 carried thereby. To facilitate an understanding of the carriage operation, FIGS. 10 through 14 and as well FIGURES 33 through 36 of the drawings illustrate this mechanism in five different positions, each position being designated by a movement 1, 2, 3, 4 or 5.

However, before operation of the carriage and its component parts takes place, it will be understood that the web 58 is properly threaded about its respective rollers as described above, entrained over the curved collar 80 about the tubular mandrel 82 and formed into a tube 58a by passage between the heat sealing member 94 and the member 92 on the tube 82. Moreover, prior to the automatic cycle of operation, the lower edge of the lower bag to be completed is sealed and the material from the hopper 424 already placed therein. In other words, the cycle of operation referred to, that is, travel of the carriage from its upwardmost position to its lowermost position and back up again brings into effect, the following steps: (1) clamping the bag forming gusseted tube 58c above the level of material all ready in the lower, partially formed bag 58d to carry it through the tube forming mechanism referred to above and generally designated by the numeral 32 in the drawings; (2) filling the upper bag (which at this point is merely the lower end of the gusseted tube 58c); (3) reforming the gussets in the top of the previously filled and partially formed lower bag 58d; (4) severing the lower bag 58d from the gusseted tube or upper bag 58c; (5) folding the upper edge or seam of the lower bag and the lower seam of the upper bag; (6) heat-sealing the upper folded seam of the lower bag 58d and the lower folded seam of the filled upper bag 58c; (7) releasing the filled and completed lowered bag; and (8) orienting the web 58 and the gusseted tube 58c for the next succeeding cycle of operation.

Referring now to FIG. 10 illustrating the carriage 34 and its component parts in their initial position or "movement 1," it will be noted that the plates 106 and 108 are at this point substantially even, the L-shaped gusset forming plates 360 and 362 being positioned between them, and that the actuating plates 144 and 146 are in an inoperative position against the front and rear carriage frame members 120 and 122 respectively. Correspondingly, all of the various operating parts carried or mounted on the carriage 34 are inactive and the general orientation of the carriage with respect to the bag forming material 58 may be seen by reference to FIG. 3 of the drawings.

Upon downward movement of the carriage 34, the main actuating cams 330 and 332 are immediately engaged by follower rolls 190 and 222 at the front and rear of the carriage respectively. At this point, the arrangement of the carriage components is substantially as seen in FIG. 11 and as well in FIG. 33. That is, the gusseted tube or upper bag 58c is firmly gripped between the reciprocating plate 108 and the clamping jaws 224 and 226 so that it, as well as the plate 108 will be moved downwardly with the carriage 34. At the instant the clamping jaws 224 engage the gusseted tube 58c and as well the plate 108, the metering cup 434 which has been previously filled with material from the hopper 424 slides into position over the opening 435 in the plate 84 to discharge its contents into the tubular mandrel 82. The material then passes down through the tube 82 between the plates 106 and 108 and into the gusseted tube 58c. Since the bottom of the tube 58c is firmly clamped by the jaws 224 and 226, the material is trapped in the tube or more properly at this point, the upper bag. Also, introduction of material into the tube at this precise time is desirable because the impact of the material is taken by the clamping jaws rather than the bagging material itself. It will be noted further that at this point in the cycle of operation, the camming fingers 376 and 378 on the carriage release the struts 364 and 366 thus causing the gusset forming plates 360 and 362 to be removed from between the plates 106 and 108. Since the plate 108 is movable with respect to the plate 106 and, in fact, upon feeding is out of horizontal register therewith, there will be no tendency for the material to be impeded or otherwise blocked by the small horizontal opening afforded between the plates.

The direct mechanical connection of the shaft 50 to the gear box 39 through shafts 49 and 51 thus enables accurate synchronization of the metering cup 434 coming into register with the opening 435 to feed the material into the gusseted and clamped tube 58c. Continued rotation of the shaft 50 effects pivotal movement of the feed plate 432 about shaft 438 so that the cup is carried back under the hopper discharge outlet 429 and back over the tube 82 at precisely the same time interval during the next cycle of operation.

As soon as the actuating plates 144 have been urged to their inwardmost positions by the engagement of cam follower rolls 190 and 222 with cams 330 and 332 respectively, not only do the clamping jaws 224 and 226 firmly engage the gusseted tube 58c and the plate 108, but also at this point a number of other carriage supported elements come into operation. For example, it will be noted that the upper seam of the lower bag 58b is at this time clamped between the L-shaped member 295 on the front actuating plate 144 and the lower heating jaw 296 on the rear actuating plate 146. This, of course, firmly grasps and anchors the upper seam of the lower bag for subsequent operations to follow. Of extreme importance, however, is the fact that also at this point in the cycle of operations the rods 412 on the underside of the rear actuating plate 146 have engaged the radially extending lugs 406 and 408 respectively on the actuating levers or arms 398 and 400 to move the gusset reforming fingers 382 and 383 inwardly toward the center of the carriage and thus toward the lower bag. The reason for this operation is principally because upon the filling of the gusseted tube 58c or upper bag, the previously folded pleats or gussets 58a are deformed during the filling operation and before a neat and properly formed seam can be placed in the upper edge of the lower bag 58d, the gussets must be reformed therein. Thus, since the inward movement of the gusset reforming fingers 382 and 383 occur substantially simultaneously with the clamping action of L-shaped member 295 on the heating mandrel 296, the gusset 58a is completely reformed and present in the upper edge of the lower bag 58d prior to the actual folding and heat sealing of this upper seam. Accordingly, an extremely neat and flawless upper seam is made possible by this mechanism.

Almost simultaneously upon engagement of the clamps 224 and 226 on the plate 108, the knife blade actuating follower rod 328 makes contact with the cam 354 effecting movement of the knife blade 320 into the bifurcated channel member 322 to sever or shear the lower bag 58d from the upper bag or gusseted tube 58c. As aforementioned, the L-shaped member 295 on the front actuating plate 144 engages the upper seam of the lower bag 58d and firmly clamps it against the lower heating mandrel 296. Thus, the lower bag 58d is prevented from dropping even though it has been completely severed from the upper bag 58c.

Immediately after forward engagement of the follower rolls 190 and 222 with the cam plates 330 and 332 to move the actuating plates 144 and 146 to their inwardmost position, the follower roll 282 on the follower crank 276 comes into engagement with the cam plate 346 as shown in FIG. 11. The initial upward movement of the cam follower roll 282 with respect to the carriage 34 causes the curved finger 288 to engage the rear end of the folding channel actuating rod 270, thus moving the folding channel 268 inwardly toward the rear actuating plate 146. As can be seen from FIG. 34, the lower seam of the upper gusseted tube or bag 58c is urged between the back-up mandrel 266 and the L-shaped member 293 on the rear actuating plate 146 to effect a single horizontal fold therein while simultaneously, the upper seam of the lower bag 58d is urged between the reciprocable heating mandrel 294 and the mandrel 296 positioned thereneath to form a similar fold in the lower bag. As the carriage moves downwardly and the follower crank 276 pivoted upwardly, the curved finger passes the folding channel actuating rod 270 and permits its return under the influence of the helical tension spring 274. Immediately thereafter, the adjustable block 292 on the follower crank 276 engages the yoke 254 on the end of the folding bar actuating rod 248. Inward movement of the rod 248 pivots the curved fingers upwardly thus moving the folding rod 242 in the curved or generally L-shaped slot 240 in the brackets 238. The effect of this folding rod movement may be seen by reference to FIG. 35, and as shown therein the lower seam which has been previously folded is now doubled back up against the reciprocable plate 108 and carried between the heat sealing members 258 and 266 respectively. Upon full engagement of the follower roll 282 with the cam plate 346, the striking face 290 thereon engages the bolt head 264 on the shaft 260 to move the heater 258 into engagement with the folded seam at the bottom of the gusseted tube 58c and clamps it against the back-up mandrel 266.

Thus, it will be seen that by this operation, a highly effective heat sealed seam is formed on the bottom of the upper bag for gusseted tube 58c. Moreover, it will be noted that since the material fed into the tube 58c is retained above the clamping jaws 224 and 226 it remains positioned remotely from both the folding members and the heat sealing members. Because of this, there is no danger of subjecting the material to damaging heat or pressure.

As will be understood by comparing FIGS. 12 with FIG. 13, or movement 3 with movement 4, slightly after full engagement of the cam follower roll 282 with the cam plate 346 to effect heat sealing of the lower seam on the upper bag, the follower roll 312 engages the cam plate 348 located at the rear of the machine. Through this engagement, the follower arm 310 is caused to be pivoted upwardly and in turn moves the follower roll 306 upwardly because of the camming surface 314. This effects a pivotal movement of the lever arm 303 about the pin 304 to move the upper heating mandrel 294 downwardly against the bias of spring 100 to engage the upper seam of the lower bag and effect a heat sealing thereof. The position of these respective members at this point is substantially as seen in FIGURES 13 and 36 of the drawings. As in the sealing of the lower seam of the top bag 58c, it will be noted that the upper seam is formed completely without in any manner affecting the material present in the bag.

As shown in FIG. 14, the carriage is in the position termed "movement 5" or in that position in which all of the various cam followers have disengaged their respective cam plates, permitting the actuating components of the carriage to be returned to their initial position. When this position occurs, of course, the lower bag 58d now completely filed and sealed is dropped to a discharged chute positioned beneath the carriage and may be caused to fall on a discharge conveyor which will carry the filled bag on to subsequent stations.

Prior to reaching the final downward position as illustrated in FIG. 14, however, the web 58 from which the bags are formed is oriented so that the clamps 224 and 226 grip the gusseted tube at precisely the proper place so that previously printed labels on the web will be properly indexed or allocated with respect to the bag forming operation. For this purpose, the web is provided with indexing marks, which are "seen" by the photoelectric cell 78 to energize the solenoid 119. Upon energization of the solenoid 119, the clamp 118 firmly grips the threaded or notched portion 117 of the upper end of the rod 114. Since the rod is resiliently connected to the horizontal beam 115 at the upper end of the carriage mounted rods 48 through spring 116, the plate 108 at the bottom of the rod 114 may be momentarily stopped while the carriage completes its downward course of travel.

To release the clamping jaws 224 and 226 from the gusseted bag and plate 108 during stoppage of the plate 108 by the clamp 118, the follower arm 232 is moved outwardly by engagement of the roll 234 on the end thereof with the cam 350 mounted on the rear of the supporting strut 352. Thus, when the carriage moves upwardly during the last half of its cycle and reengages the bag material to start the next cycle, it does so such that the clamping jaws 224 and 226 engage it at precisely the proper point as determined by the stopping action of the photoelectric cell and solenoid arrangement referred to.

Accordingly, the labels on the bags will be properly correlated with the bag forming operation.

CONCLUSIONS

From the foregoing description, it becomes apparent to one familiar in this art that the new and improved machine for forming, filling and sealing bags provided by this invention effectively accomplishes the objects hereinbefore set out, as well as many others. For example, the use of the reciprocating carriage mechanism 34 and its component clamping, folding and sealing elements, moving with respect to the frame and coacting with respect to the various cam plates thereon permits the entire bag forming operation to be carried out by the torque transmitted through a single shaft. In fact, the only phase of the operation not controlled directly by movement of the carriage 34 is the feeding operation and even this is motivated through a simple rotary shaft takeoff from the drive transmission unit. Thus, the problem of very accurately synchronizing the various bag forming and filling operations is greatly simplified due to the direct mechanical connection of the various operating components with the actuating cam plates mounted on the frame.

Also, the mounting of all of the cutting, folding and sealing mechanisms on the actuating plates 144 and 146 and yet actuating these mechanisms by separate cam and cam follower combinations is highly advantageous. The reason for this is that by so mounting these mechanisms, they are first brought into position for actuation and then actuated. Then upon upward travel of the carriage they are, by this arrangement, capable of movement out and away from the filled, partially filled bag 58c to start the next cycle of operation.

Of perhaps somewhat more significance, however, is the provision in a bag forming, filling and sealing apparatus of the type described above of highly effective means for forming pleats or gussets in the sides of the bags to assure neat and proper formation of folded heat sealed end seams on the filled bags. More specifically, this gusset forming and retaining operation is brought about by the fact that the tube of bag forming sheet material 58a as it descends from the tubular mandrel 82 is continuously pleated by the coaction of plate members 106, 108, 360 and 362, in a manner such that in common bag materials like cellophane, wax paper and other suitable materials, a permanent crease or fold is imparted to the material as it descends from the mandrel 82.

As explained above, since the gussets thus formed are removed by the introduction of material into the partially formed bag or tube, the action of the reforming fingers 382 and 383 depending from beneath the carriage 34 serves the extremely important function of assuring the presence of proper gussets prior to or simultaneously with the clamping of the upper edge of the bag prior to folding and sealing. Through this arrangement, the gussets are thus accurately formed and reformed without in any way applying pressure to the material present in the bag being operated on.

Finally, by this invention it is seen that a new and effective technique is afforded in bag forming, filling and sealing operations by which a very neat, attractive and as well strong bag is formed. By this is meant the method to which this invention relates wherein the lower end of a continuously formed tube of bag forming material is folded upon itself, sealed, the tube filled and the top folded upon itself and sealed while at the same time side pleats or gussets are being formed and maintained. Were it not for these gussets, neatly formed seals at the tops and bottoms of the bags would not be possible.

Thus, it will be apparent that by this invention a highly effective new and unique apparatus and method for forming, filling and sealing bags is provided and that while the above description delineates a preferred form of the invention, it is to be distinctly understood that many modifications therein can be effected without in any way departing from the spirit and scope of this invention as defined in the appending claims.

I claim:
1. An apparatus for forming, filling and sealing bags comprising: a frame; a reciprocable carriage on said frame; a tubular mandrel on said frame above said carriage; means for continuously forming a web of sheet material into a tube about said mandrel; a pair of spaced plates mounted depending centrally below said mandrel; a pair of laterally movable plates mounted on said frame and movable toward each other into engagement with said sheet material and between said pair of spaced plates to form gussets in the tube of sheet material; means on said carriage for clamping, folding and sealing the lower and upper edges of the bag being formed at predeterminted operational time intervals; means for filling the bags; and a pair of laterally movable fingers on said carriage for reforming said gussets prior to sealing the upper edge of the bags being formed.

2. The apparatus recited in claim 1 wherein one of said pair of spaced plates is movable with respect to the other.

3. The apparatus recited in claim 1 including: a plurality of cams on said frame; and a plurality of cam followers on said carriage whereby said clamping, folding and sealing means are actuated by engagement of said cams by said followers upon movement of said carriage.

4. In a bag forming, filling and sealing machine of the type wherein a pre-labeled web of bagging material is continuously formed into a tube and the tube is carried through successive sealing, filling and sealing operations to form bags, means for clamping the free end of the tube to move it through said operations; a back-up plate positioned within said tube and movable generally with said means; and means for stopping movement of said plate and said web after said operations and after disengagement of said clamping means to register the labels on said web with the next succeeding cycle of bag forming operations.

5. In a bag forming apparatus of the type in which a continuous tube of bag material is formed, means for folding the formed end of the tube prior to sealing comprising: a backing plate extending within the tube to a point short of the tube end; means for clamping the tube against said plate; means for engaging the portion of the tube extending beyond said plate to establish a fold therein; and means for doubling said fold back against said plate.

6. The apparatus recited in claim 5 in which said means for doubling said fold comprises: a rod positioned beyond the end of said plate and in a plane generally parallel to said plate; and means for moving said rod inwardly and against said plate.

7. An apparatus for forming, filling and sealing bags comprising: a frame; means on said frame for continuously forming a web of bagging material into a tube, said means including a mandrel, a pair of spaced plates depending from said mandrel, and a pair of laterally movable plates operative to fold the tube between said spaced plates to form gussets in the side thereof; means on said frame for feeding a predetermined quantity of material into said tube; a reciprocable carriage on said frame; a pair of opposed reciprocable actuating plates on said carriage; means on said plates actuable upon movement thereof for clamping the tube at spaced upper and lower points; means on said plates for severing the tube between said spaced upper and lower clamping points; means carried by said plates for folding the severed free ends of the bagging material between said clamping points; means also carried by said plates for heat sealing the folded, clamped ends of the bagging material; cam means on said frame; and cam follower means on said carriage whereby movement of said carriage with respect to said frame effects sequential operation of said clamping, severing, folding and sealing means as controlled by said cams and cam followers.

References Cited in the file of this patent

UNITED STATES PATENTS

| | | |
|---|---|---|
| 583,349 | Wende et al. | May 25, 1897 |
| 1,696,376 | Ayars | Dec. 25, 1928 |
| 1,937,501 | Aldrich | Dec. 5, 1933 |
| 1,986,422 | Zwoyer | Jan. 1, 1935 |
| 2,146,831 | Maxfield | Feb. 14, 1939 |
| 2,606,412 | Salfisberg | Aug. 12, 1952 |
| 2,801,774 | Harkess et al. | Aug. 6, 1957 |
| 2,837,883 | Bracey | June 10, 1958 |